(12) United States Patent
Chen et al.

(10) Patent No.: US 11,586,948 B2
(45) Date of Patent: Feb. 21, 2023

(54) INTERNET OF THINGS SYSTEM WITH PREDICTION OF FARMLAND SOIL STATUS AND METHOD FOR CREATING MODEL THEREOF

(71) Applicants: Wen-Liang Chen, Hsinchu (TW); Lung-Chieh Chen, Hsinchu (TW); Szu-Chia Chen, Hsinchu (TW); Wei-Han Chen, Hsinchu (TW); Chun-Yu Chu, Hsinchu (TW); Yu-Chi Shih, Hsinchu (TW); Yu-Ci Chang, Hsinchu (TW); Tzu-I Hsieh, Hsinchu (TW); Yen-Ling Chen, Hsinchu (TW); Li-Chi Peng, Hsinchu (TW); Meng-Zhan Lee, Hsinchu (TW); Jui-Yu Ho, Hsinchu (TW); Chi-Yao Ku, Hsinchu (TW); Nian-Ruei Deng, Hsinchu (TW); Yuan-Yao Chan, Hsinchu (TW); Erick Wang, Hsinchu (TW); Tai-Hsiang Yen, Hsinchu (TW); Shao-Yu Chiu, Hsinchu (TW); Jiun-Yi Lin, Hsinchu (TW); Yun-Wei Lin, Hsinchu (TW); Fung Ling Ng, Hsinchu (TW); Yi-Bing Lin, Hsinchu (TW); Chin-Cheng Wang, Hsinchu (TW)

(72) Inventors: Wen-Liang Chen, Hsinchu (TW); Lung-Chieh Chen, Hsinchu (TW); Szu-Chia Chen, Hsinchu (TW); Wei-Han Chen, Hsinchu (TW); Chun-Yu Chu, Hsinchu (TW); Yu-Chi Shih, Hsinchu (TW); Yu-Ci Chang, Hsinchu (TW); Tzu-I Hsieh, Hsinchu (TW); Yen-Ling Chen, Hsinchu (TW); Li-Chi Peng, Hsinchu (TW); Meng-Zhan Lee, Hsinchu (TW); Jui-Yu Ho, Hsinchu (TW); Chi-Yao Ku, Hsinchu (TW); Nian-Ruei Deng, Hsinchu (TW); Yuan-Yao Chan, Hsinchu (TW); Erick Wang, Hsinchu (TW); Tai-Hsiang Yen, Hsinchu (TW); Shao-Yu Chiu, Hsinchu (TW); Jiun-Yi Lin, Hsinchu (TW); Yun-Wei Lin, Hsinchu (TW); Fung Ling Ng, Hsinchu (TW); Yi-Bing Lin, Hsinchu (TW); Chin-Cheng Wang, Hsinchu (TW)

(73) Assignee: National Yang Ming Chiao Tung University, Hsinchu (TW)

( * ) Notice: Subject to any disclaimer, the term of this patent is extended or adjusted under 35 U.S.C. 154(b) by 632 days.

(21) Appl. No.: 16/658,153

(22) Filed: Oct. 20, 2019

(65) Prior Publication Data
US 2021/0004694 A1 Jan. 7, 2021

Related U.S. Application Data

(60) Provisional application No. 62/748,673, filed on Oct. 22, 2018.

(51) Int. Cl.
*G06F 15/16* (2006.01)
*G06N 5/04* (2023.01)
(Continued)

(52) U.S. Cl.
CPC ............. *G06N 5/04* (2013.01); *G06N 20/00* (2019.01); *H04L 67/12* (2013.01)

(58) Field of Classification Search
CPC ........... H04L 67/12; G06N 5/04; G06N 20/00
(Continued)

(56) References Cited

U.S. PATENT DOCUMENTS 6,937,939 B1 * 8/2005 Shibusawa ............ G01N 33/246
356/336
10,097,517 B2 * 10/2018 McElwee ............. H04L 63/0428
(Continued)

*Primary Examiner* — Moustafa M Meky

(57) ABSTRACT

An IoT system includes a computing module for controlling an integral function of the system and including an analysis
(Continued)

unit and a machine learning unit. The analysis unit is capable of operational analysis and creating a predictive model and creating a predictive model according to the data analyzed. The machine learning unit has an algorithm function to create a corresponding learning model. An IoT module is electrically connected to the computing module to serve as an intermediate role. At least one detection unit is electrically connected to the IoT module and disposed in soil to detect data of environmental and soil conditions and sends the data detected to the computing module for subsequent analysis.

9 Claims, 4 Drawing Sheets

(51) Int. Cl.
*G06N 20/00* (2019.01)
*H04L 67/12* (2022.01)

(58) Field of Classification Search
USPC .......................................................... 709/200
See application file for complete search history.

(56) References Cited

U.S. PATENT DOCUMENTS

| | | | |
|---|---|---|---|
| 10,728,336 B2 * | 7/2020 | Akhtar | G06Q 50/01 |
| 10,762,982 B1 * | 9/2020 | Wu | G06N 20/00 |
| 2016/0247075 A1 * | 8/2016 | Mewes | G06N 5/04 |
| 2016/0247076 A1 * | 8/2016 | Mewes | G06N 5/04 |
| 2016/0247079 A1 * | 8/2016 | Mewes | G06N 5/048 |
| 2018/0063079 A1 * | 3/2018 | Ding | H04L 63/0464 |
| 2020/0167874 A1 * | 5/2020 | Azuma | G06Q 10/0637 |

* cited by examiner

INTERNET OF THINGS SYSTEM WITH PREDICTION OF FARMLAND SOIL STATUS AND METHOD FOR CREATING MODEL THEREOF

TECHNICAL FIELD

The invention relates to internet of things (IoT) devices, particularly to an internet of things system with prediction of farmland soil status and a method for creating model thereof.

RELATED ART

To increase the crop yield, continuously using soil to perform farming will naturally loosen surface soil so as to reduce quality of soil. Finally, the soil will lose nutrient enough to maintain growth of crop.

To supplement nutrient of soil, farmers apply a large amount of fertilizer. The chemical fertilizer can help the crop to grow, but it also causes acidification of soil and serious degradation. This forms a vicious circle.

According to official statistical reports, approximate 40% of agricultural soil has degraded or seriously degraded. If fertilization methods are not changed now, then all surface soil will disappear in 60 years. This brings us a dilemma, how to maintain soil health under the premise of offering sufficient food to increasing population. Obviously, a new solution is needed if we want to avoid such a world crisis which is approaching.

SUMMARY OF THE INVENTION

An object of the invention is to provide an internet of things (IoT) system with prediction of farmland soil status, which uses an interconnected model system to connect sensors through an IoTtalk platform and enhances accordance between actual environment and theoretical parameters.

Another object of the invention is to provide a method for predicting growth status of crop on farmland, which can continuously monitor soil status and can immediately warn farmers when fertilization is necessary.

To accomplish the above objects, the invention provides an internet of things (IoT) system with prediction of farmland soil status and a method for model creature. The IoT system includes a computing module for controlling an integral function of the system and including an analysis unit and a machine learning unit. The analysis unit is capable of operational analysis and creating a predictive model and creating a predictive model according to the data analyzed. The machine learning unit has an algorithm function to create a corresponding learning model. An IoT module is electrically connected to the computing module to serve as an intermediate role. At least one detection unit is electrically connected to the IoT module and disposed in soil to detect data of environmental and soil conditions and sends the data detected to the computing module for subsequent analysis.

DETAILED DESCRIPTION OF THE INVENTION

Figure 1:
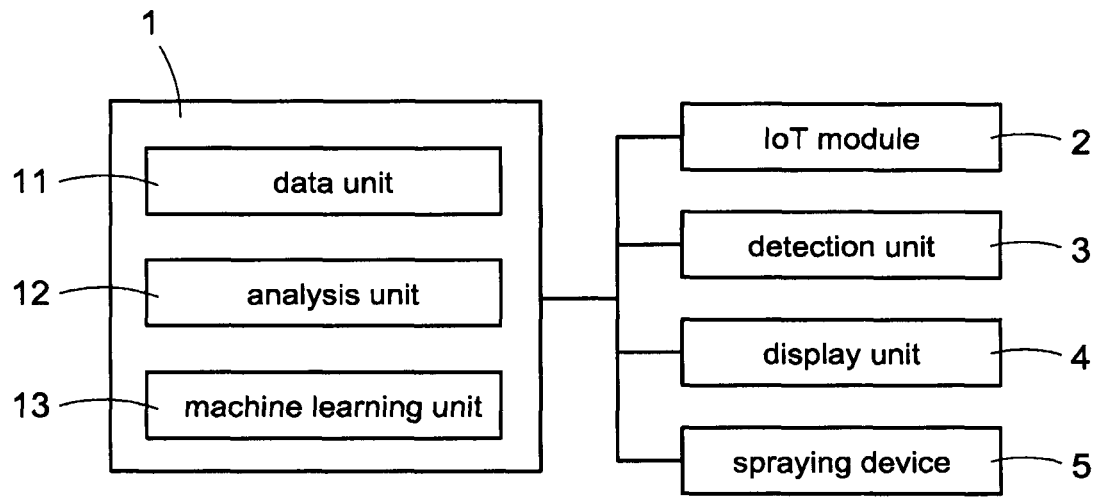
FIG. 1 is a block diagram of the IoT system of the invention.

Please refer to FIG. 1. The internet of things (IoT) system with prediction of farmland soil status of the invention includes a computing module 1. In this embodiment, the computing module 1 is a background server. The computing module 1 is a master device of the system for controlling an integral function of the system. The computing module 1 may be a real server or a cloud server. The computing module further includes a data unit 11, an analysis unit 12 and a machine learning unit 13. The data unit 11 is a database for storing data collected by the system and other necessary data and can be accessed by the analysis unit 12 for data analysis.

The analysis unit 12 is electrically connected to the data unit 11 for receiving or inputting the data and is capable of operational analysis and creating a predictive model. The analysis unit 12 has at least one algorithm, such as regression analysis, and is configured to create a work list and a process of the data collected to filter irrelative data, to perform cross-validation to confirm weighting relationship of every single data under different conditions, and to create a predictive model according to the data analyzed. As a result, the system is capable of predicting the environment detected, performs prediction analysis according to the data input or detected and output a prediction notice. Also, all the analysis data will be stored in the data unit 11 for backup or serving as learning analysis. The machine learning unit 13 in this embodiment is an artificial intelligence learning module. The machine learning unit 13 is electrically connected to the analysis unit 12, has at least one algorithm function with ability to select, such as regression algorithm or autoregressive moving algorithm, and creates a corresponding learning model to perform false analysis and grouping of subsequent data.

The computing module 1 is further electrically connected to an IoT module 2 (IoTtalk), which connects with the computing module 1 via network. The IoT module 2 in this embodiment is a gateway device to serve as an intermediate role in data transmission. The IoT module 2 further electrically connects to at least one detection unit 3. The detection unit 3 in this embodiment is multiple in number. The detection unit 3 is a sensor and is connected to the IoT module 2 via wireless network. The detection units 3 are disposed in soil to detect data of environmental and soil conditions, such as temperature, sir humidity, soil humidity, elevation, atmospheric pressure, pH value, EC value, etc., or related information of nitrogen, phosphorus and potassium. The detection units 3 send the data detected to the computing module 1 for subsequent analysis.

The computing module 1 is further electrically connected to a display unit 4. The display unit 4 in this embodiment is a device with a screen, such as a mobile device. The display unit 4 receives the data from the computing module 1 and forms a monitor dashboard on the display unit 4 so that users can synchronously read all conditions of the soil detected. In addition, the computing module 1 electrically connects to a spraying device 5 which is controlled by the computing module 1 to spray an additive for biological stimulation. This can improve crop yield or soil health and affect soil microbes. The additive in this embodiment is a biological stimulant, such as a fertilizer, microorganism or peptide.

Figure 2:
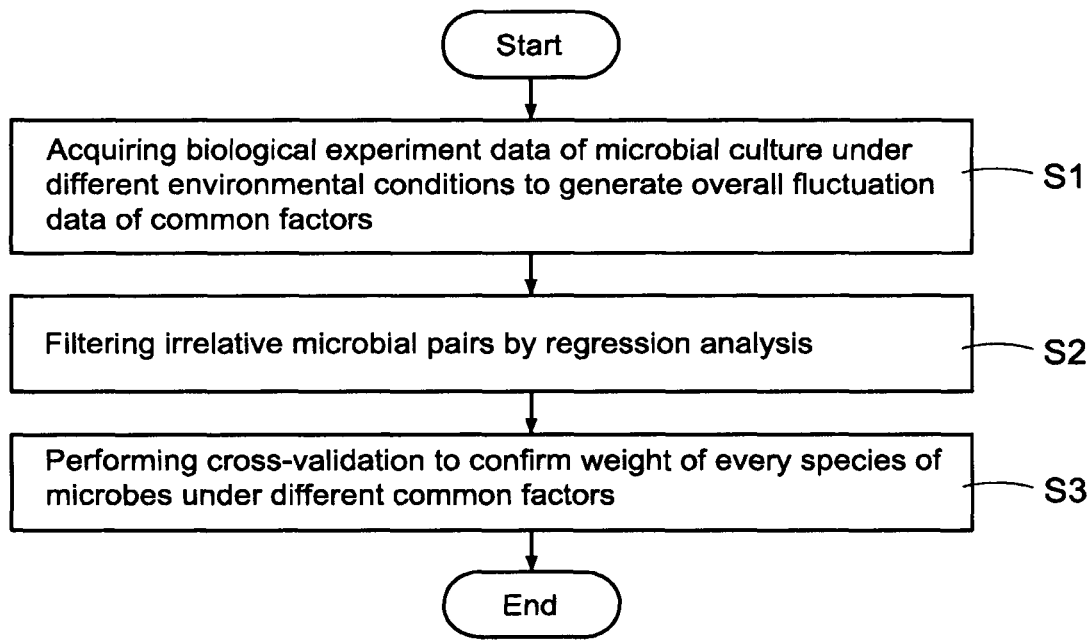
FIG. 2 is a flowchart of the method of model creating of the invention.

Please refer to FIG. 2. The method of model creature of the invention uses the data collected by the abovementioned system and is performed in the analysis unit 12. To simulate relationship between a biological stimulant and microbial groups, biological experiment data of microbial culture under different environmental conditions are acquired to generate overall fluctuation data (S1) related to common factors. In this embodiment, the common factors include temperature, pH and salinity. Taking *Bacillus subtilis* as an example, its common factors can be depicted as the following formula. However, the method is limited to *Bacillus subtilis*. Growth rate of microbes can be depicted as follows:

$$R_{temp}(T) = \alpha \times [(T-T_{min}) \times (1-e^{(b(T-T_{max}))})]^2$$

where $R_{temp}$ stands for growth rate of microbes, T is experiment temperature, $T_{min}$ is the lowest temperature that microbes can tolerate, $T_{max}$ is the highest temperature that microbes can tolerate, and t is the time of microbes culture. To express the relationship between temperature and growth rate of microbes, the growth rate of microbes is expressed by a logistic regression equation as follows:

$$f(R_{temp}, t) = C/1 + A \cdot e^{-R_{temp} \cdot t}$$

where A is the initial growth rate of microbes, C is the maximum of microbes growth under specific condition. To find out the growth rate of microbes under different pHs, the following equation is adopted:

$$R_{pH}(pH) = c \cdot (pH-pH_{min}) \cdot (pH-pH_{max})/d \cdot ((pH-pH_{min}) \cdot (pH-pH_{max}) - e \cdot (pH-pH_{opt})^2)$$

where pH is a pH value assigned by the microbes culture experiment, $pH_{max}$ is the highest pH value that microbes can tolerate, $pH_{min}$ is the lowest pH value that microbes can tolerate, $pH_{opt}$ is the optimal pH value for microbes culture, and t is the time of microbes culture. To express the relationship between pH value and microbes growth, the growth rate of microbes is expressed by a logistic regression equation as follows:

$$f(R_{pH}, t) = C/1 + A \cdot e^{-R_{pH} \cdot t}$$

To find out the growth rate of microbes in different salinities, the following equation is adopted:

$$R_{sal}(sal) = (f \cdot sal^2) + (g \cdot sal) + h$$

where $R_{sal}$ is the salinity assigned by the microbes culture experiment, and t is the time of microbes culture. To express the relationship between salinity value and microbes growth, the growth rate of microbes is expressed by a logistic regression equation as follows:

$$f(R_{sal}, t) = C/1 + A \cdot e^{-R_{sal} \cdot t}$$

After the relationship between the common factors and the growth rate of microbes has been found out, to define the influence level of the three with respect to the growth rate of microbes, we set up three sets of temperature, pH and salinity and find out weights of the three, its equation is listed below:

$$f = \alpha \cdot f(R_{temp}, t) + \beta \cdot f(R_pH, t) + \gamma \cdot f(R_{sal}, t)$$

Figure 3:
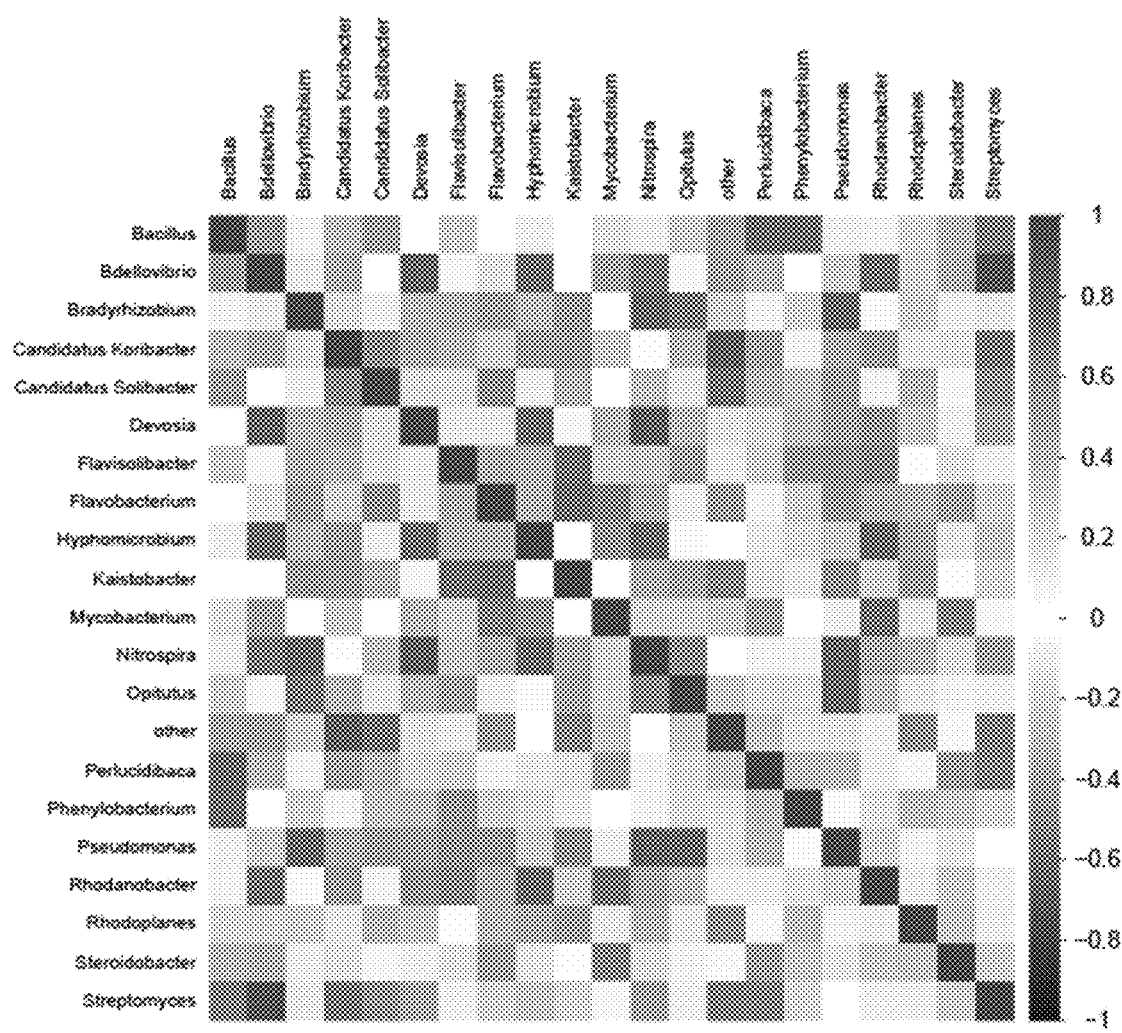
FIG. 3 is a heat map of microbial species and common factors of the invention.

The unknown parameters, including α, β, γ and the unknown numbers a, b, c, d, e, f, g in the three functions of $f(R_{temp}, t)$' $f(R_pH, t)$' $f(R_{sal}, t)$, in the equation can be found out by microbial experiments of microbes culture. The above equations simulate the direct relationship between the microbial stimulant and the microbial groups in soil, especially the microbial level of metabolism of this element. Fluctuation of these common factors can be obtained by the above common equations to estimate microbial community changes. In detail, the common factors, temperature, pH and salinity are helpful to simulate the overall fluctuations of the microbiota. The more specific factors, such as nitrogen, phosphorus and potassium, are very helpful to predict oscillation of nutrient metabolism microorganisms during fertilizer treatment. As for the Spearman rank correlation value, the numerals of coefficient value near −1 express stronger negative correlation, and the numerals of coefficient value near +1 express stronger positive correlation. As shown in FIG. 3, it shows correlation between the 20 most abundant microbial groups in soil samples.

Figure 4:
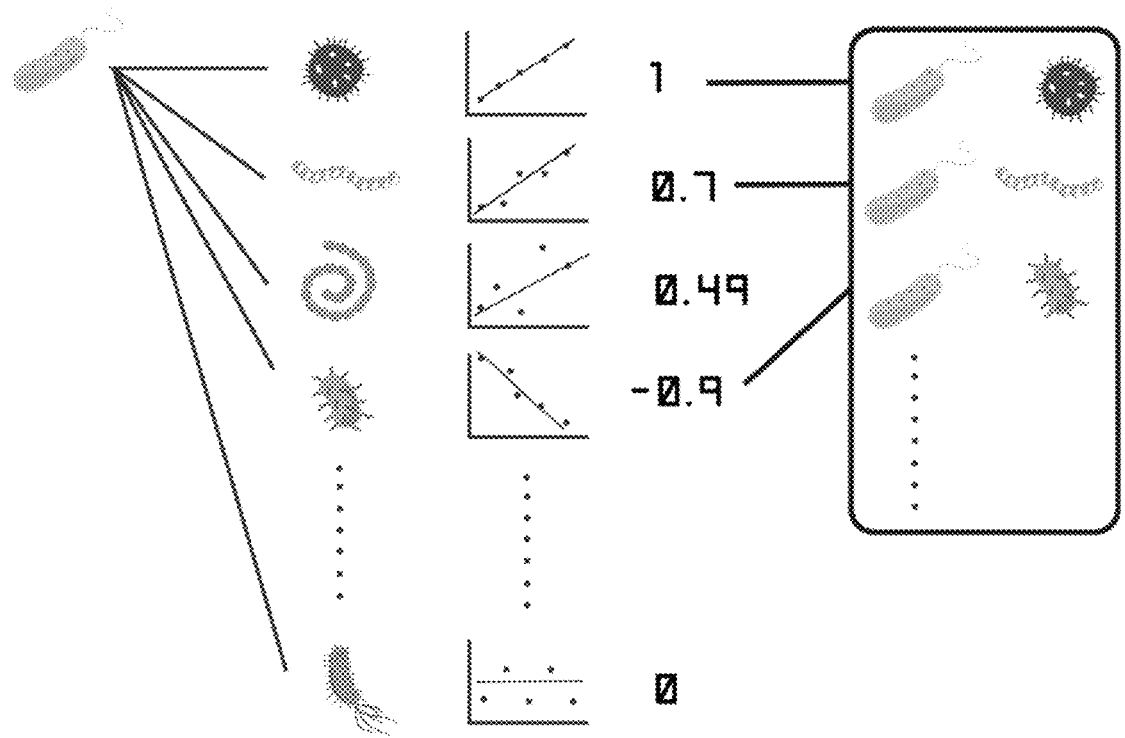
FIG. 4 is a schematic view of microbial data analysis.

Please refer to FIG. 2. The second step of the method of model creature is to filter irrelative microbial pairs by regression analysis of the common factors including temperature, pH and salinity (S2). In this embodiment, relative numerals calculated by the three common factors are added with fertilization frequency to further create a predictive model. It includes that which microbes have strong relevance can be confirmed by regression analysis. According to the above calculation, relative coefficients below −0.7 are defined as negative correlation, and relative coefficients above +0.7 are defined as positive correlation. After that, the microbial groups are associated with the additive with biological stimulation to obtain subsequent data collection. A corresponding chart can be obtained by the analysis unit 12 as shown in FIG. 4. As a result, the changes after the microbial groups associated with the additive can be generated.

Figure 5:
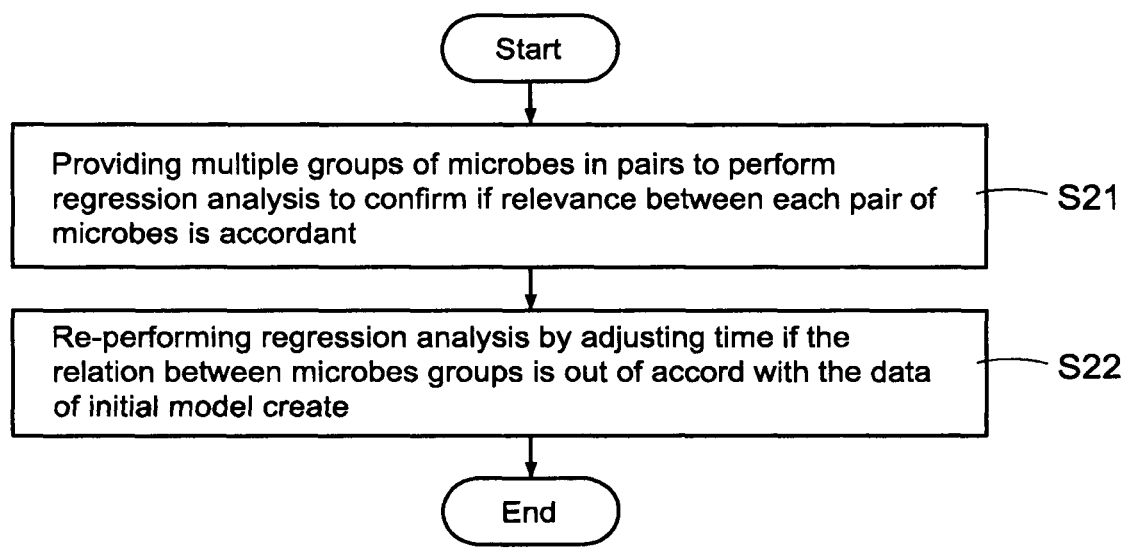
FIG. 5 is flowchart of cross-validation of the invention.

The third step of the method of model creature is to perform cross-validation to confirm weight of every species of microbes under different common factors (S3). In this embodiment, because the obtained curve is a theoretical relation between two species of microbes and differences between soil conditions of different samples are so large, it is possible that the curved relation may be changed. To solve this problem, the method collects soil in the farmland to perform microbial analysis, and then distributes different weight to each regression curve through cross-validation (in the embodiment, triple cross-validation is the best). Please refer to FIG. 5. The cross-validation includes the steps of: providing multiple groups of microbes to perform regression analysis to confirm if relevance between each pair of microbes is accordant (S21); and keeping the distributed weight of regression curve if the relation between microbes groups is in accord with the data of initial model created, while re-perform regression analysis by adjusting time if the relation between microbes groups is out of accord with the data of initial model created (S22). In other words, the soil has been analyzed for several months to confirm if the data obtained is in accord with the actual situation. By the cross-validation, the weighting values can be regulated and an initial predictive model can be accomplished. The predictive model makes an initial prediction to the change of microbes groups according to the additive with biological stimulation, and the machine learning unit 13 is associated to collect more data to validate repeatedly, so that predictive accuracy of the method of the invention can be improved.

What is claimed is:

1. An internet of things (IoT) system with prediction of farmland soil status, comprising:
   a computing module, being a master device for controlling an integral function of the system, further comprising:
   a data unit for storing data collected by the system and other necessary data;
   an analysis unit, electrically connected to the data unit for receiving or inputting the data, being capable of operational analysis and creating a predictive model, having at least one algorithm, configured to create a work list and a process of the data collected to filter irrelative data and to perform cross-validation to confirm weighting relationship of every single data under different conditions, and creating a predictive model according to the data analyzed; and a machine learning unit, electrically connected to the analysis unit, having at least one algorithm function, and creating a corresponding learning model to perform false analysis and grouping of subsequent data;

an IoT module, electrically connected to the computing module to serve as an intermediate role; and at least one detection unit, electrically connected to the IoT module, disposed in soil to detect data of environmental and soil conditions, and sending the data detected to the computing module for subsequent analysis.

2. The internet of things (IoT) system of claim 1, wherein the computing unit is a background server.

3. The internet of things (IoT) system of claim 1, wherein the algorithm of the analysis unit is regression analysis.

4. The internet of things (IoT) system of claim 1, wherein the algorithm function of the machine learning unit is regression algorithm or autoregressive moving algorithm.

5. The Internet of things (IoT) system of claim 1, wherein the IoT module is a gateway device.

6. The Internet of things (IoT) system of claim 1, wherein the detection unit is a sensor.

7. The Internet of things (IoT) system of claim 1, wherein the computing module is further electrically connected to a display unit for receiving data from the computing module and forming a monitor dashboard on the display unit.

8. The internet of things (IoT) system of claim 7, wherein the display unit is a device with a screen.

9. The internet of things (IoT) system of claim 1, wherein the computing module electrically connects to a spraying device which is controlled by the computing module to spray an additive for biological stimulation.

* * *